(12) United States Patent
Kim et al.

(10) Patent No.: US 9,738,771 B2
(45) Date of Patent: Aug. 22, 2017

(54) ORGANIC-INORGANIC COMPOSITE CONTAINING CERAMIC PARTICLES HAVING FINE PROJECTIONS ON SURFACE THEREOF

(71) Applicant: KOREA INSTITUTE OF CERAMIC ENGINEERING AND TECHNOLOGY, Seoul (KR)

(72) Inventors: Younghee Kim, Seoul (KR); Sooryong Kim, Seoul (KR); Wootack Kwon, Seoul (KR); Hyungmi Lim, Gunpo-si (KR); Yoonjoo Lee, Seoul (KR); Kyoungmok Nam, Seoul (KR); Boyeon Kim, Busan (KR)

(73) Assignee: KOREA INSTITUTE OF CERAMIC ENGINEERING AND TECHNOLOGY, Seoul (KR)

( * ) Notice: Subject to any disclaimer, the term of this patent is extended or adjusted under 35 U.S.C. 154(b) by 62 days.

(21) Appl. No.: 14/763,533

(22) PCT Filed: Jan. 28, 2013

(86) PCT No.: PCT/KR2013/000682
§ 371 (c)(1),
(2) Date: Nov. 30, 2015

(87) PCT Pub. No.: WO2014/115916
PCT Pub. Date: Jul. 31, 2014

(65) Prior Publication Data
US 2016/0083551 A1    Mar. 24, 2016

(51) Int. Cl.
| | |
|---|---|
| C08K 3/04 | (2006.01) |
| C08K 3/00 | (2006.01) |
| C04B 26/20 | (2006.01) |
| C04B 26/18 | (2006.01) |
| C04B 26/04 | (2006.01) |
| C04B 26/10 | (2006.01) |
| C04B 26/12 | (2006.01) |
| C08K 3/22 | (2006.01) |
| C08K 3/26 | (2006.01) |
| C08K 3/28 | (2006.01) |
| C08K 3/34 | (2006.01) |
| C08K 3/36 | (2006.01) |
| C08K 3/38 | (2006.01) |
| C08K 7/00 | (2006.01) |
| C08K 7/04 | (2006.01) |
| C04B 111/00 | (2006.01) |

(52) U.S. Cl.
CPC .......... *C08K 3/0033* (2013.01); *C04B 26/045* (2013.01); *C04B 26/10* (2013.01); *C04B 26/12* (2013.01); *C04B 26/18* (2013.01); *C04B 26/20* (2013.01); *C08K 3/04* (2013.01); *C08K 3/22* (2013.01); *C08K 3/26* (2013.01); *C08K 3/28* (2013.01); *C08K 3/34* (2013.01); *C08K 3/36* (2013.01); *C08K 3/38* (2013.01); *C08K 7/00* (2013.01); *C08K 7/04* (2013.01); *C04B 2111/00525* (2013.01); *C08K 2003/2227* (2013.01); *C08K 2003/2241* (2013.01); *C08K 2003/2296* (2013.01); *C08K 2003/265* (2013.01); *C08K 2003/282* (2013.01); *C08K 2003/385* (2013.01)

(58) Field of Classification Search
CPC ........... C04B 26/18; C04B 26/20; C08K 3/04; C08K 3/22; C08K 3/26; C08K 3/28; C08K 3/34; C08K 3/38; C08K 7/04
USPC ........ 524/404, 413, 425, 428, 430, 432, 443
See application file for complete search history.

(56) References Cited

U.S. PATENT DOCUMENTS

| | | |
|---|---|---|
| 2003/0019843 A1 | 1/2003 | Kawai et al. |
| 2005/0281999 A1 | 12/2005 | Hofmann et al. |
| 2012/0318131 A1 | 12/2012 | Forrest |

FOREIGN PATENT DOCUMENTS

| | | |
|---|---|---|
| KR | 10-1990-0015983 A | 11/1990 |
| KR | 10-2002-0064161 A | 8/2002 |
| KR | 10-2006-0009234 A | 1/2006 |
| KR | 10-1202705 B1 | 11/2012 |

OTHER PUBLICATIONS

International Search Report for PCT/KR2013/000682 mailed Aug. 1, 2013 from Korean Intellectual Property Office.

*Primary Examiner* — Edward Cain
(74) *Attorney, Agent, or Firm* — Paratus Law Group, PLLC

(57) ABSTRACT

An organic-inorganic composite including: a plurality of anisotropic ceramic particles having different aspect ratios; a resin that is combined with the ceramic particles; and a plurality of projections projecting out from the surface of the ceramic particles, thereby increasing the shear resistance of the interface between the ceramic particles and the resin. At least some of the ceramic particles neighboring each other are closely arranged such that the projections partially contact each other, thereby increasing the shear resistance between the ceramic particles due to the contacting ceramic particles.

20 Claims, 12 Drawing Sheets

US 9,738,771 B2

ORGANIC-INORGANIC COMPOSITE CONTAINING CERAMIC PARTICLES HAVING FINE PROJECTIONS ON SURFACE THEREOF

CROSS REFERENCE TO PRIOR APPLICATION

This application is a National Stage Patent Application of PCT International Patent Application No. PCT/KR2013/000682 (filed on Jan. 28, 2013) under 35 U.S.C. §371, which is hereby incorporated by reference in their entirety.

TECHNICAL FIELD

The present invention relates to an organic-inorganic composite composed of ceramic particles and a resin, and it especially relates to an organic-inorganic composite exhibiting high mechanical strength properties capable of resisting various types of damages such as brittle fracture, ductile fracture, and fatigue fracture as the fine projections formed on the surface of the ceramic particles increase the coupling force of the ceramic particles with the resin and also exhibit an anchoring effect that suppresses slippage so as to remarkably strengthen the shear resistance at the interface between the ceramic particles and the resin and the shear resistance between the ceramic particles.

BACKGROUND ART

In general, various structures in machinery, construction, and civil engineering fields and parts for electronic apparatuses as well as transporters such as an aircraft, a motor vehicle, and a train are often exposed to extreme environments such as changes in temperature and scratches as well as various types of loads and impacts involving changes in pressure as they are, and in this case, these are required to be designed to withstand the extreme environments.

For example, a motor vehicle (10) which undergoes high-speed running throughout the year to be exposed to extreme environments such as significant changes in temperature, changes in pressure, strong wind loads, impacts, and scratches is illustrated in FIG. 1. In the case of the motor vehicle (10), the panel used in the car body is required to be fabricated to be light and to exhibit high-level mechanical strength properties so as not to be easily damaged in response to the extreme environments.

Accordingly, a pressed steel plate is typically used as the material of the panel applied to the body of the motor vehicle (10) so as to meet the mechanical strength properties in response to the extreme environments, but the weight of the pressed steel plate is significantly heavy to be the main factor of the retrograde movement to the weight reduction being an issue in recent years. Hence, in recent years, a high strength steel for motor vehicle, magnesium, and aluminum are adopted and used as a light weight material for some panels for the motor vehicle (10). These materials are spotlighted as a light weight material despite a high stiffness. Among these, the high strength steel has advantages to increase economic efficiency by reducing the total vehicle weight and to enhance the high-speed stability and quietness by maintaining a robust car body. More recently, a carbon fiber reinforced plastic (CFRP) which has been mainly used in fuselage parts for aircraft has attracted attention as a future core material for weight reduction. CFRP is produced by subjecting an acrylic fiber to a special heat treatment, and its weight is only half of iron and about 70% of aluminum. However, CFRP has an advantage that its strength is as high as about 10 times iron.

However, although such new materials have attracted attention, there are significant constraints in general use of such new materials in the market due to price competitiveness and rarity of the materials. Hence, in recent years, the development of a new composite material or structure that can replace the existing panel for car body is accelerated, and such a technology development is actively discussed not only in the motor vehicle field but also in the transporter field such as aircraft and train. The machinery, building, civil engineering fields.

Especially, an attempt to apply an excellent structure that is present in a natural living body such as abalone shell and exhibits high mechanical strength properties while having a light weight is recently made in order to develop new functional materials. In the case of such an excellent functional structure present in the natural living body, an attempt to carefully analyze the excellent functional structure has been made by a number of pioneering researchers, but satisfactory results are not obtained and such an attempt is at a standstill since there are technical difficulties in the structure analysis and simplifying operation by which the structures found in nature are generalized and generally used, and in the manufacture of the actual product.

DISCLOSURE

Technical Problem

Accordingly, the present invention is made to solve the various problems of the prior art as described above, and an object thereof is to provide an organic-inorganic composite equipped with ceramic particles having fine projections formed on the surface thereof so that the shear resistance at the interface between the ceramic particles and a resin and the shear resistance between the ceramic particles are strengthened by a coupling force of the ceramic particles with the resin and an anchoring effect due to the fine projections formed on the surface of the ceramic particles.

Technical Solution

In order to accomplish the above object, the organic-inorganic composite equipped with ceramic particles having fine projections formed on the surface thereof according to the technical idea of the present invention is configured to include a plurality of anisotropic ceramic particles having different aspect ratios; and a resin combined with the ceramic particles, and the technical configuration of the organic-inorganic composite is characterized in that the shear resistance at the interface between the ceramic particles and the resin is increased as the organic-inorganic composite is further equipped with a plurality of projections formed to project out from the surface of the ceramic particles and the shear resistance between the ceramic particles is increased by projections in contact with one another as at least some of the ceramic particles neighboring one another are closely disposed so as to bring the projections into partial contact with one another.

Here, the organic-inorganic composite may be characterized in that the ceramic particles are plate-shaped particles having an aspect ratio of 2:5 or less or whisker-shaped particles having an aspect ratio of 5:2 or more.

In addition, the organic-inorganic composite may be characterized in that the ceramic particles includes plate-shaped particles having an aspect ratio of 2:5 or less and whisker-shaped particles having an aspect ratio of 5:2 or more in a mixed form.

In addition, the organic-inorganic composite may be characterized in that spherical ceramic balls having a smaller size than the anisotropic ceramic particles are further disposed between the anisotropic ceramic particles as an additive for increasing frictional force.

In addition, the organic-inorganic composite may be characterized in that the projections are composed of two or more kinds of projections having different sizes and/or shapes.

In addition, the organic-inorganic composite may be characterized in that the projection is formed in an area of from 10 to 95% of a total area of a surface of the ceramic particles.

In addition, the organic-inorganic composite may be characterized in that a height of the projection projecting out from a surface of the ceramic particles is from 10 to 700 nm.

In addition, the organic-inorganic composite may be characterized in that the projection is the same kind of substance as the ceramic particles.

In addition, the organic-inorganic composite may be characterized in that the projection is a different kind of substance from the ceramic particles.

In addition, the organic-inorganic composite may be characterized in that a content of the ceramic particles in the organic-inorganic composite is from 30 to 95% by weight.

In addition, the organic-inorganic composite may be characterized in that an average orientation angle of the ceramic particles with respect to a parallel plane decreases as the content of the ceramic particles in the organic-inorganic composite increases.

In addition, the organic-inorganic composite may be characterized in that a density of the ceramic particles is increased by setting the average orientation angle of the ceramic particles with respect to a parallel plane to 30° or less in a case in which the content of the ceramic particles in the organic-inorganic composite is 50% by weight or more.

In addition, the organic-inorganic composite may be characterized in that a material of the ceramic particles is any one selected from the group consisting of calcium carbonate, zinc oxide, alumina, silica, titania, carbon, silicon carbide, aluminum nitride, and boron nitride.

In addition, the organic-inorganic composite may be characterized in that the resin is any one selected from the group consisting of a polyamide-based resin, a polyimide-based resin, a polyacetal-based resin, a polyester-based resin, a polysulfone-based resin, a polyphenylene sulfide-based resin, a polyethylene-based resin, and a polypropylene resin.

Advantageous Effects

The organic-inorganic composite equipped with ceramic particles having fine projections formed on the surface thereof according to the present invention exhibits high mechanical strength properties capable of resisting various types of damages such as brittle fracture, ductile fracture, and fatigue fracture as the fine projections formed on the surface of the ceramic particles increase the coupling force with the resin and also exhibit an anchoring effect that suppresses slippage so as to remarkably strengthen the shear resistance at the interface between the ceramic particles and the resin and the shear resistance between the ceramic particles.

In addition, in the present invention, an anchoring effect can be exhibited as the projections come in contact with one another even in a case in which the content of the ceramic is low through the control of the orientation angle of the ceramic particles.

In addition, in the present invention, the content of the ceramic particles can be easily increased and the ceramic particles are further densified by the configuration to include plate-shaped ceramic particles and whisker-shaped ceramic particles at the same time.

In addition, in the present invention, the structural stability of the organic-inorganic composite can be further improved by the configuration to add spherical ceramic balls as an additive for increasing the frictional force together with the ceramic particles.

DESCRIPTION OF MAIN REFERENCE NUMERALS OF DRAWINGS

Figure 1:
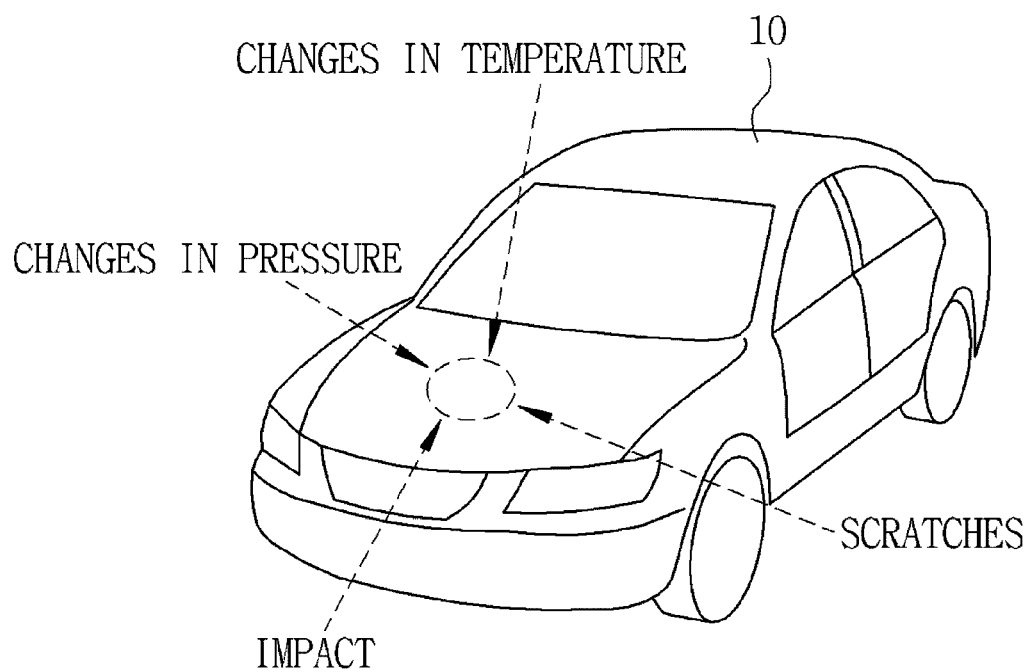
FIG. 1 is a reference diagram for explaining the prior art.

110: Ceramic particle 111: Surface of ceramic particle
112: Projection 120: Resin
130: Ceramic ball

[Best Mode]

The organic-inorganic composites equipped with ceramic particles having fine projections formed on the surface thereof according to embodiments of the present invention will be described in detail with reference to the accompanying drawings.

The present invention can be variously changed and may have a number of forms, and thus specific embodiments will be illustrated in the drawings and described herein in detail. However, this is not intended to limit the invention to the specific form disclosed, but it should be understood that the present invention include all changes, equivalents and substitutes included in the spirit and scope of the present invention. Upon describing the drawings, like reference numerals are used for like elements. In the accompanying drawings, the dimensions of the structures may be enlarged than the actual dimensions for clarity of the invention or may be reduced than the actual dimensions for understanding of the schematic structure.

In addition, although the terms first, second, and the like, may be used herein to describe various elements and/or components, these elements and/or components should not be limited by these terms. These terms are only used to distinguish one element or component from another element or component. For example, a first element or component discussed below could be termed a second element or component without departing from the scope of the invention. Meanwhile, unless otherwise defined, all terms including technical and scientific terms used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
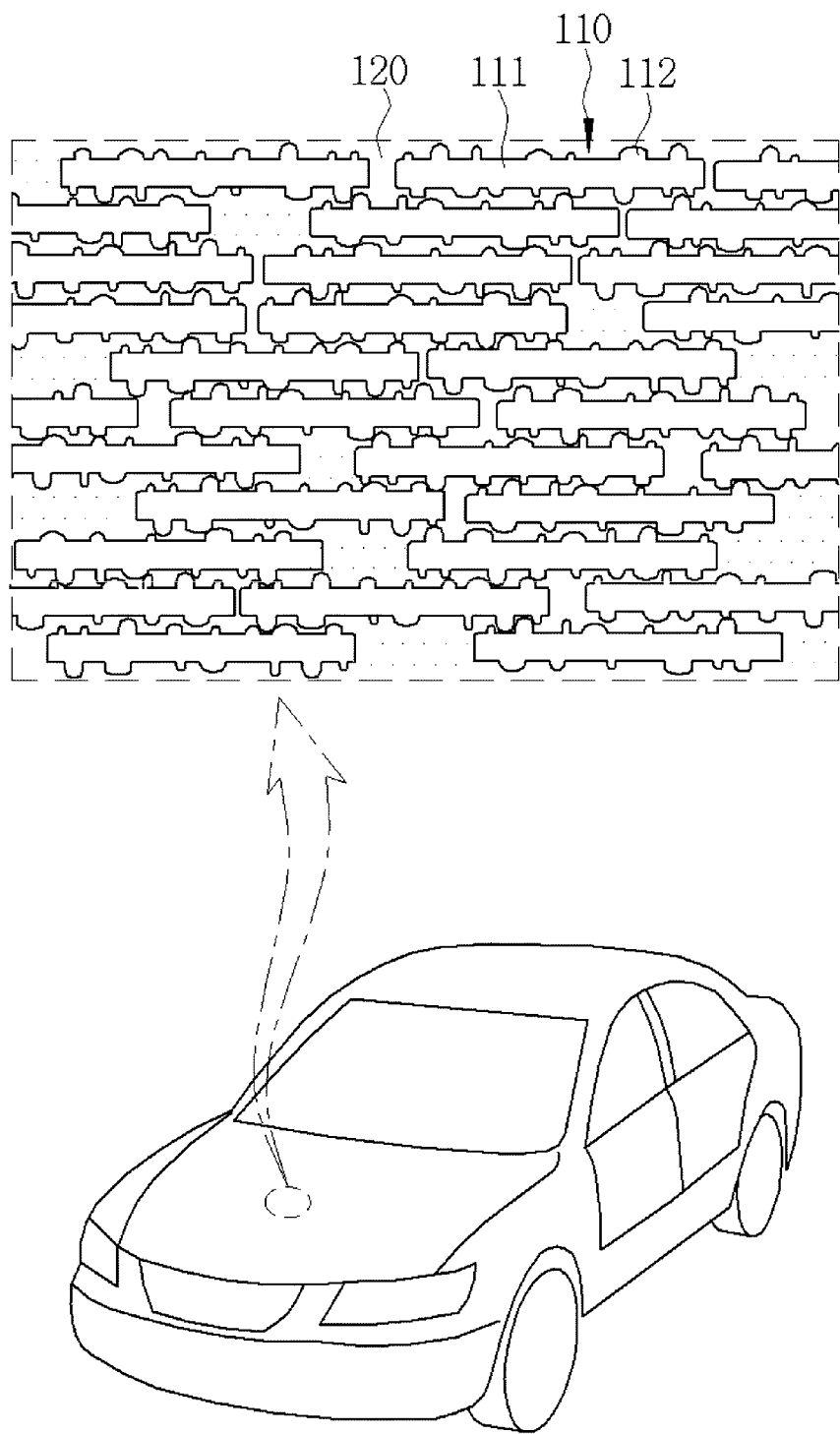
FIG. 2 is a diagram illustrating the use state of the organic-inorganic composite according to an embodiment of the present invention applied to a panel for body of a motor vehicle.
Figure 3:
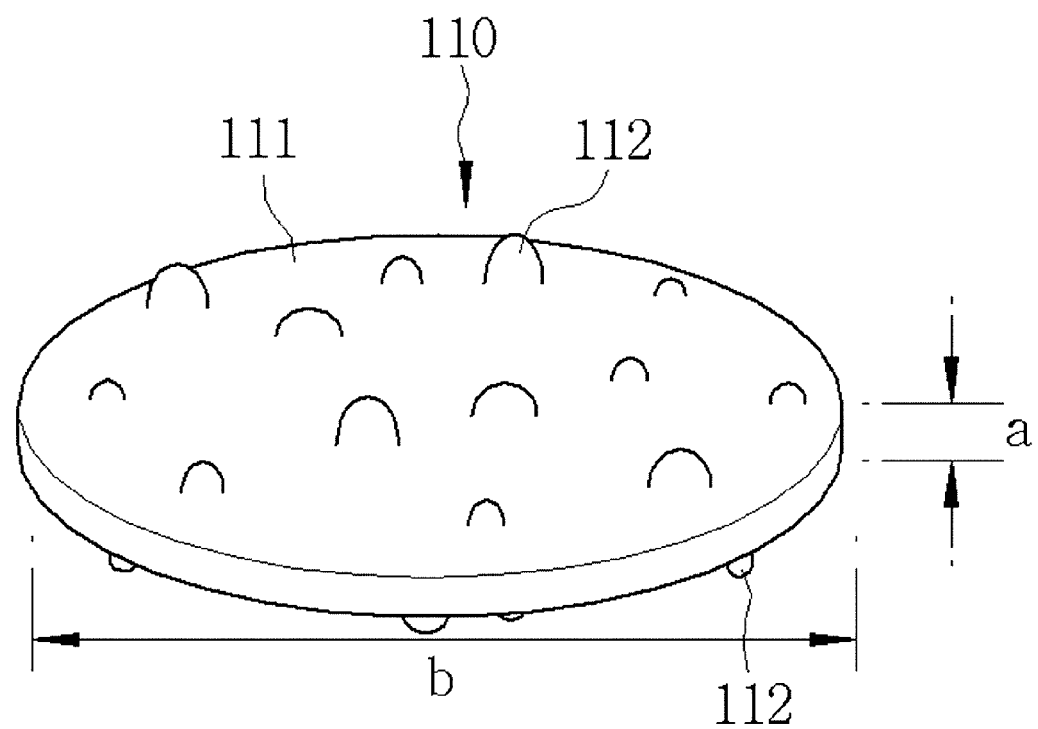
FIG. 3 is a perspective diagram for explaining the configuration of the ceramic particles having projections formed thereon in the organic-inorganic composite according to an embodiment of the present invention.

FIG. 2 is a diagram illustrating the use state of the organic-inorganic composite according to an embodiment of the present invention applied to a panel for car body of a motor vehicle, and FIG. 3 is a perspective view for explaining the configuration of the ceramic particles having projections formed thereon in the organic-inorganic composite according to an embodiment of the present invention.

As illustrated in the drawings, the organic-inorganic composite according to an embodiment of the present invention is configured so as to have a mechanical strength high enough to be applied to functional materials having various forms in the transporters such as an aircraft, a motor vehicle, and a train, electronic apparatuses, and machinery, construction, and civil engineering fields which are often exposed to extreme environments such as changes in temperature and scratches as well as various types of loads and impacts involving changes in pressure as they are.

For this purpose, the organic-inorganic composite according to an embodiment of the present invention has a configuration in which the organic-inorganic composite is formed by the combination between plate-shaped ceramic particles (110) which are oriented and stacked and a resin (120) and is further equipped with a plurality of fine projections (112) formed to project out from a surface (111) of the ceramic particles (110). The configuration in which the fine projections (112) are formed on the surface (111) of the ceramic particles (110) in the organic-inorganic composite composed of the ceramic particles (110) and the resin (120) may seem simple but has not been imagined so far in the organic-inorganic composite including plate-shaped ceramic particles (110), and by the configuration, the contact area of the ceramic particles (110) with the resin (120) is increased so that not only the coupling force between the ceramic particles (110) and the resin (120) is increased but also an anchoring effect is exhibited, and as a result, the shear resistance at the interface between the ceramic particles (110) and the resin (120) and the shear resistance between the ceramic particles (110) are significantly increased.

The ceramic particles (110) have a size in a range of from 5 to 300 μm and a plate shape having an aspect ratio of 2:5 or less, and the shape may be a disk shape as illustrated in FIG. 3 or various other shapes belonging to a plate shape.

Here, the content of the ceramic particles (110) in the organic-inorganic composite can be appropriately changed depending on the material to which the present invention will be applied in the future, and it is preferable that the content is selected in a range of from 30 to 95% by weight. The reason is as follows. In a case in which the content of the ceramic particles (110) is set to less than 30% by weight, the ceramic particles (110) are scatteringly distributed due to a low density and the partial contact area between the projections (112) decreases so that the anchoring effect can not be sufficiently exhibited. In a case in which the content of the ceramic particles (110) exceeds 95% by weight, the content of the resin (120) is relatively too low so that the resin (120) is not able to connect between the ceramic particles (110), and as a result, the organic-inorganic composite has a structural defect to be vulnerable to brittle fracture.

With regard to the content of the ceramic particles (110) described above, the ceramic particles (110) are configured such that the average orientation angle with respect to the parallel plane decreases as the content increases. This is because the content of the resin (120) relatively decreases as the content of the ceramic particles (110) increases and thus the coupling force of the ceramic particles (110) decreases. Hence, it is concerned that the brittle fracture of the organic-inorganic composite is easily caused by an external force applied in the transverse direction. However, the anchoring effect increases as the area in which the projections (112) formed on the neighboring ceramic particles (110) are in contact with one another increases by increasing the content of the ceramic particles (110) and thus densely configuring the ceramic particles (110), and as a result, it is possible to secure the shear resistance to resist the external force in the transverse direction. On the basis of such a principle, it is preferable to increase the density of the ceramic particles (110) by setting the average orientation angle of the ceramic particles (110) with respect to the parallel plane to within 30° in a case in which the content of the ceramic particles (110) in the organic-inorganic composite is 50% by weight or more.

For reference, in the enlarged portion of FIG. 2, a form in which the content of the ceramic particles (110) reaches almost the peak and thus the ceramic particles (110) are stacked in a multi-stage is illustrated. At this time, the ceramic particles (110) are oriented without an orientation angle with respect to the horizontal plane to be substantially matched. For reference, the orientation angle depending on the content of the ceramic particles (110) will be described in detail later.

Here, the ceramic particles (110) may be composed of various ceramic materials and may be composed of metal oxides such as calcium carbonate, zinc oxide, alumina, and silica, titania, non-oxide based ceramics such as carbon, silicon carbide, aluminum nitride, and boron nitride, or other ceramic materials equivalent or having similar properties to these.

The surface (111) of the ceramic particles (110) are equipped with the projections (112) of two or more kinds having different sizes and shapes in an area of from 10 to 95% of the total area of the surface (111). Moreover, the height of the projections (112) projecting out from the surface (111) of the ceramic particles (110) varies to some extent depending on the size of the ceramic particles (110), but it is formed in a range of from 10 to 700 nm. Here, even in a case in which the projections (112) are formed in the area corresponding to 10% of the total area of the surface (111) of the ceramic particles (110), the anchoring effect can be sufficiently exhibited when the partial contact area between the projections is maximized through a densified configuration in which the number of the projections (112) is increased instead of decreasing the size thereof and the gap between the ceramic particles (110) is decreased. Moreover, as described above, when the projections are composed of two or more kinds having different sizes and shapes, the possibility that the projections come in contact with one another further increases as compared to a case in which the projections are composed of one kind having one size and shape. Here, the shape of the projections may be various, and the projections may be formed in various shapes such as an embossing shape of a domed shape, a pillar shape, a semi-spherical embossing shape, and a spherical embossing shape as illustrated in FIG. 2 or FIG. 3.

Meanwhile, the material of the projections (112) may be typically composed of the same kind of substance as the material of the ceramic particles (110) in consideration that the projections (112) are formed on the surface (111) of the ceramic particles (110) in an integral form. However, the material of the projections (112) may be composed of a different kind of substance from the ceramic particles (110) from the standpoint of ease of forming the projections on the surface (111) of the ceramic particles (110), a sufficient strength for the anchoring function, and imparting other functions. For example, the material of the projections (112) may be composed of an alumina material of a metal oxide, which is easily formed into the projections (112) by melting and adding as a fine particulate form when the material of the ceramic particles (110) is composed of aluminum nitride of a non-oxide ceramic.

It is possible to form the projections not only by a crystal growth method such as CVD or hydrothermal treatment but also by dispersing the same kind or different kinds of sols on the surface of the plate-shaped or whisker particles and conducting a heat treatment.

The resin (120) plays an intermediary role to combine the ceramic particles which may not have a mutual coupling force themselves. For this purpose, the resin (120) may be compose of any one selected from the group consisting of a polyamide-based resin, a polyimide-based resin, a polyacetal-based resin, a polyester-based resin, a polysulfone-based resin, a polyphenylene sulfide-based resin, a polyethylene-based resin, and a polypropylene resin.

Figure 4:
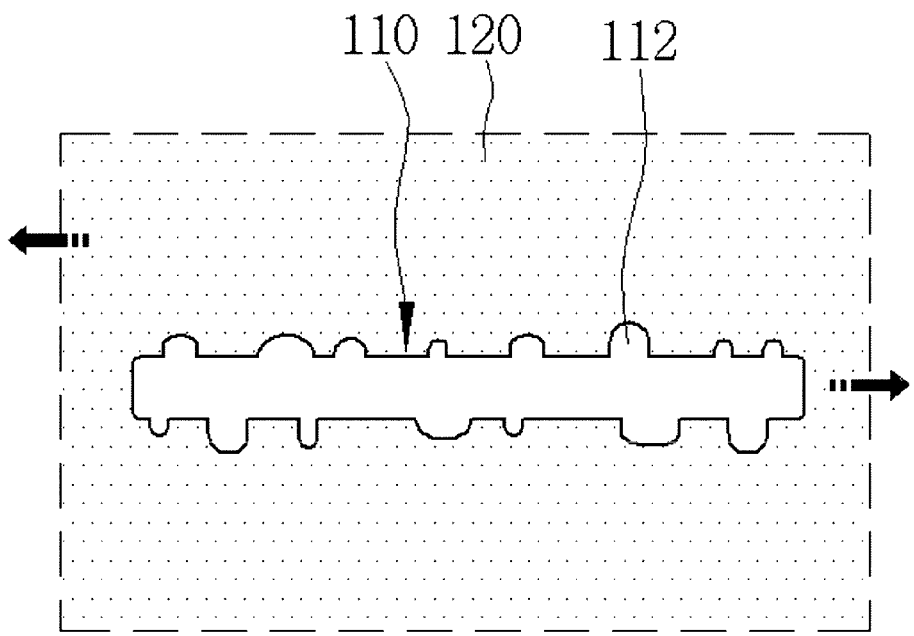
FIG. 4 is a partial cross-sectional diagram for explaining the function of the projections acting with respect to the ceramic particles and the resin in the organic-inorganic composite according to an embodiment of the present invention.
Figure 5:
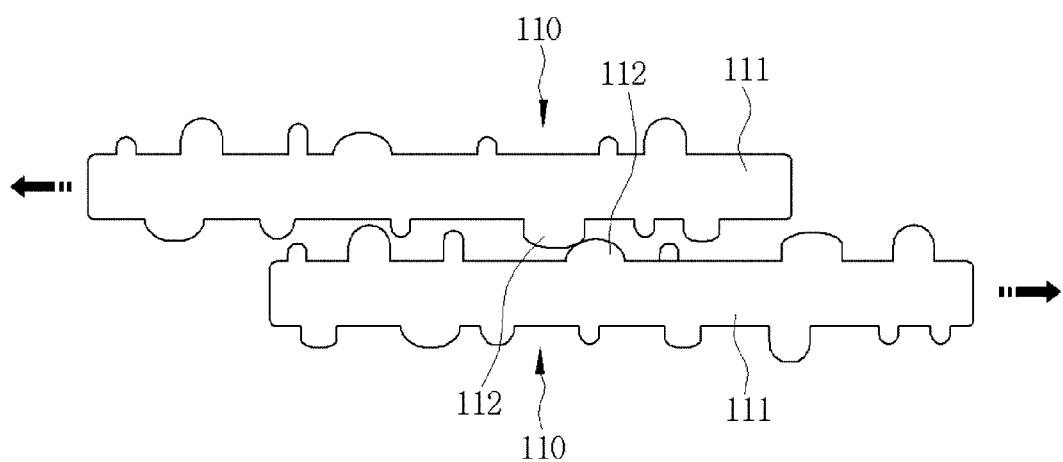
FIG. 5 is a partial cross-sectional diagram for explaining the function of the projections acting between the ceramic particles in the organic-inorganic composite according to an embodiment of the present invention.

FIG. 4 is a partial cross-sectional diagram for explaining the function of the projections acting with respect to the ceramic particles and the resin in the organic-inorganic composite according to an embodiment of the present invention, and FIG. 5 is a partial cross-sectional diagram for explaining the function of the projections acting between the ceramic particles in the organic-inorganic composite according to an embodiment of the present invention.

As illustrated in the drawings, the organic-inorganic composite according to an embodiment of the present invention is equipped with the new functions that can remarkably improve the mechanical strength by the fine the projections (112) formed to project out from the surface (111) of the ceramic particles (110). This will be described in detail below.

First, as can be seen in FIG. 4, the area of the ceramic particles (110) combined with the resin (120) can be maximized by a great number of the fine projections (112), and thus the coupling force between the ceramic particles (110) and the resin (120) significantly increases. Such a function make it possible to impart a high strength and structural stability to the whole organic-inorganic composite and allows the resin (120) to sufficiently exhibit the coupling force with respect to the ceramic particles (110) even in a case in which the content of the resin (120) is lower as compared to the ceramic particles (110).

Second, as can be seen in FIG. 4, the shear resistance at the interface between the ceramic particles (110) and the resin (120) is increased by the anchoring action of the projections (112) formed to project out from the surface (111) of the ceramic particles (110). Hence, a high shear resistance is also exhibited with respect to the external force acting in the transverse direction, especially the tensile force acting in the transverse direction indicated by the arrow, and it is possible to suppress various types of damages including brittle fracture. The effect that the shear resistance at the interface between the ceramic particles (110) and the resin (120) is increased by the anchoring action of the projections (112) on the resin (120) is almost identically maintained regardless of the contact area between the projections, and thus the effect is the ground for that the mechanical strength can be stably secured even in a case in which the contact area between the projections (112) is smaller due to a lower content of the ceramic particles (110).

Third, as can be seen in FIG. 5, the anchoring action is exhibited as the projections (112) formed to project out from the surface (111) of the ceramic particles (110) come in partial contact with one another (to extend over) and thus the shear resistance is increased so that the projections (112) do not slip from one another in the transverse direction. This makes it possible to exhibit a high shear resistance with respect to the external force acting in the transverse direction, especially the tensile force acting in the transverse direction indicated by the arrow and also to suppress various types of damages including brittle fracture. The effect that the shear resistance between the ceramic particles (110) is increased by the anchoring action due to the contact between the projections (112) is maximized especially when the content of the ceramic particles (110) is high enough to be densely stacked, and thus the effect is advantageously act when stably securing the mechanical strength even in a case in which the content of the resin (120) is low.

As described above, the organic-inorganic composite according to an embodiment of the present invention has the three new functions described above by a simple but unique configuration that the projections (112) are formed on the surface (111) of the plate-shaped ceramic particles (110). The point to be noted is that the three functions described above complexly act but the conditions that the action and the effect are maximized are different from one another. Hence, the above three functions are complementary to one another and exhibit a synergistic effect as a whole.

Figure 6:
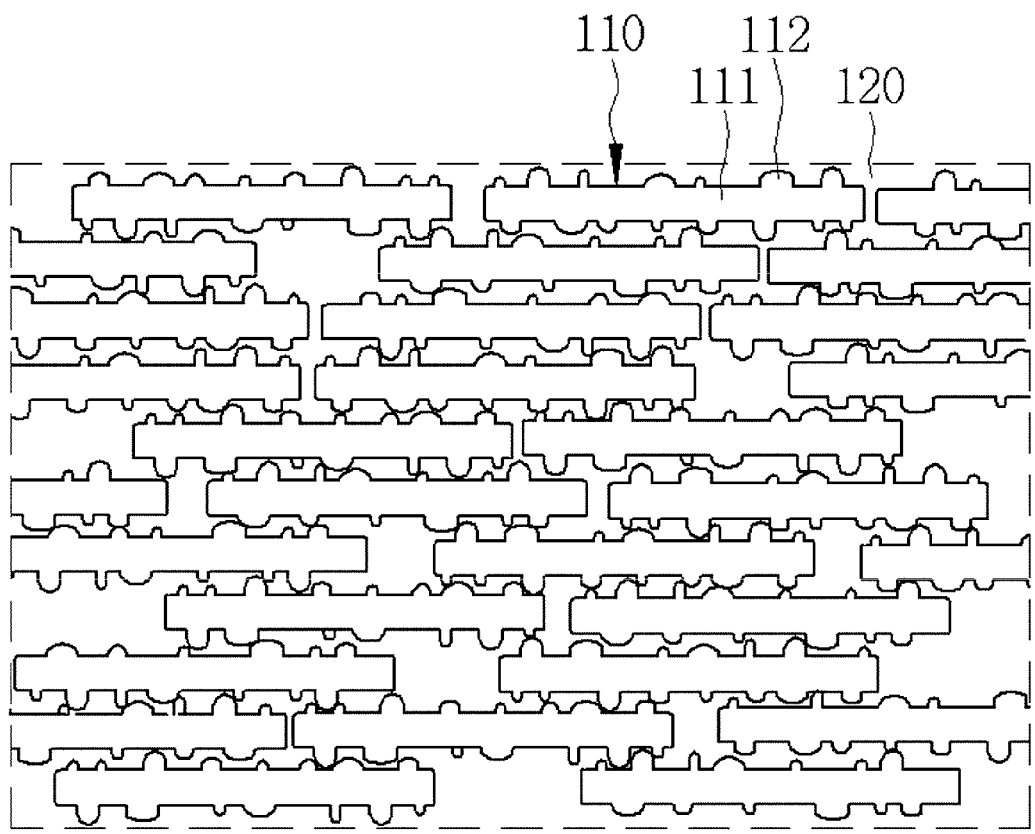
FIGS. 6 to 8 are a series of cross-sectional diagrams illustrating the states of the organic-inorganic composites according to embodiments of the present invention to which the ceramic particles are added at different contents.
Figure 7:
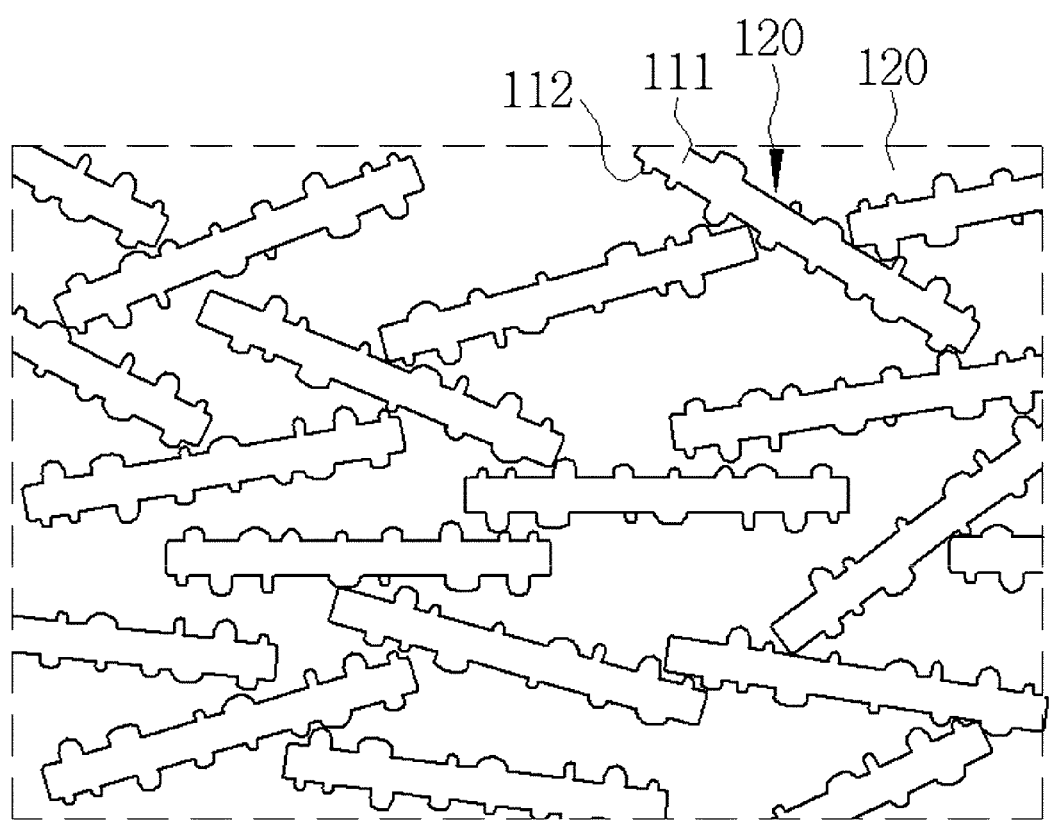
Figure 8:
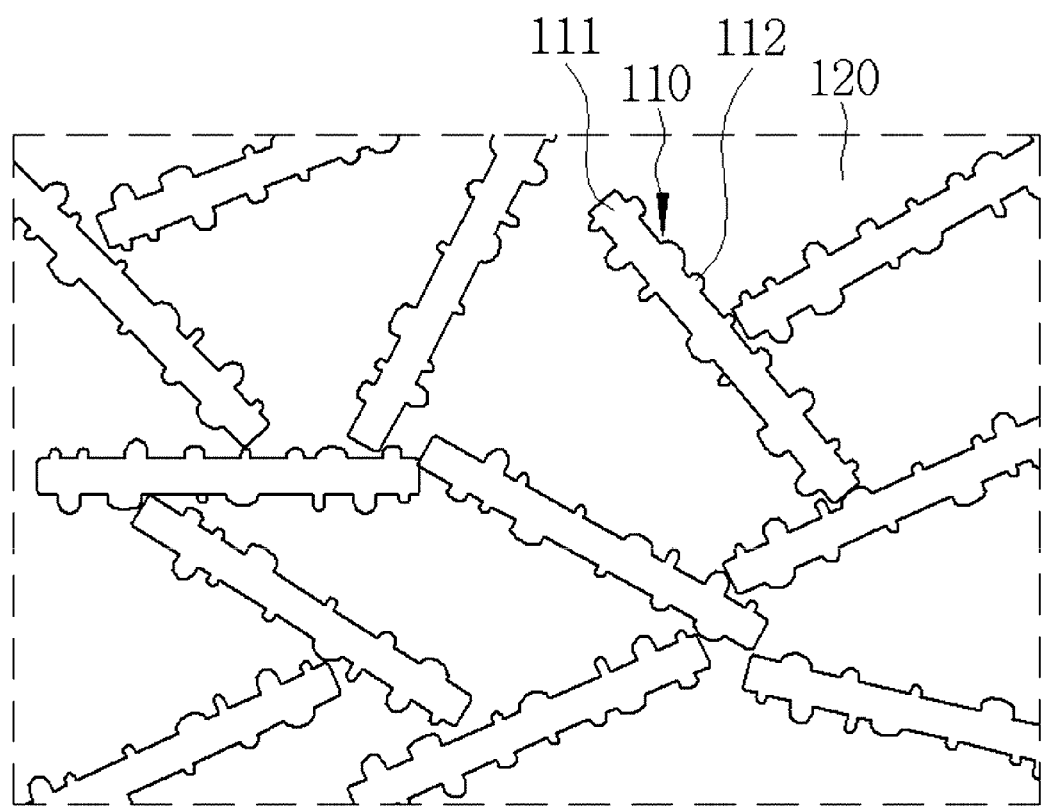

FIGS. 6 to 8 are a series of cross-sectional diagrams illustrating the states of the organic-inorganic composites according to embodiments of the present invention to which the ceramic particles are added at different contents.

As illustrated in the drawings, it is possible to configure the organic-inorganic composite according to an embodiment of the present invention such that the anchoring effect can be maximized while the projections (112) come in partial contact with one another through a configuration in which the orientation angle of the ceramic particles (110) is controlled for each content in a case in which the content of the ceramic particles (110) varies. This will be described below.

FIG. 6 is a case in which the ceramic particles (110) are added at a significantly high content. In this case, it is possible to maximize the anchoring effect by the contact between the projections (112) by eliminating the orientation angle of the ceramic particles (110) with respect to the horizontal plane through compression molding or pressing to apply a pressure to the ceramic particles (110) in the longitudinal direction and densely configuring the ceramic particles (110) in a stacked form.

FIG. 7 is a case in which the ceramic particles (110) are added at a content of about 50% by weight. In this case, it is possible to maximize the anchoring effect by setting the average orientation angle of the ceramic particles (110) with respect to the horizontal plane to about 30°. Here, it is important to increase the orientation angle of the projections (112) to an extent to which the projections (112) are at least in partial contact with one another although the average orientation angle of the ceramic particles (110) with respect to the horizontal plane is decreased.

FIG. 8 is a case in which the ceramic particles (110) are added at a content of about 30% by weight. In this case, the anchoring effect can be maximized as the average orientation angle of the ceramic particles (110) with respect to the horizontal plane is set to about 45° although the content of the ceramic particles (110) is significantly low.

[Mode]

Meanwhile, the present invention may be implemented by modified embodiments mainly having a configuration to change the shape of the ceramic particles (110) from a plate shape to a whisker shape. Hereinafter, the configuration of such a modified embodiment will be described.

Figure 9:
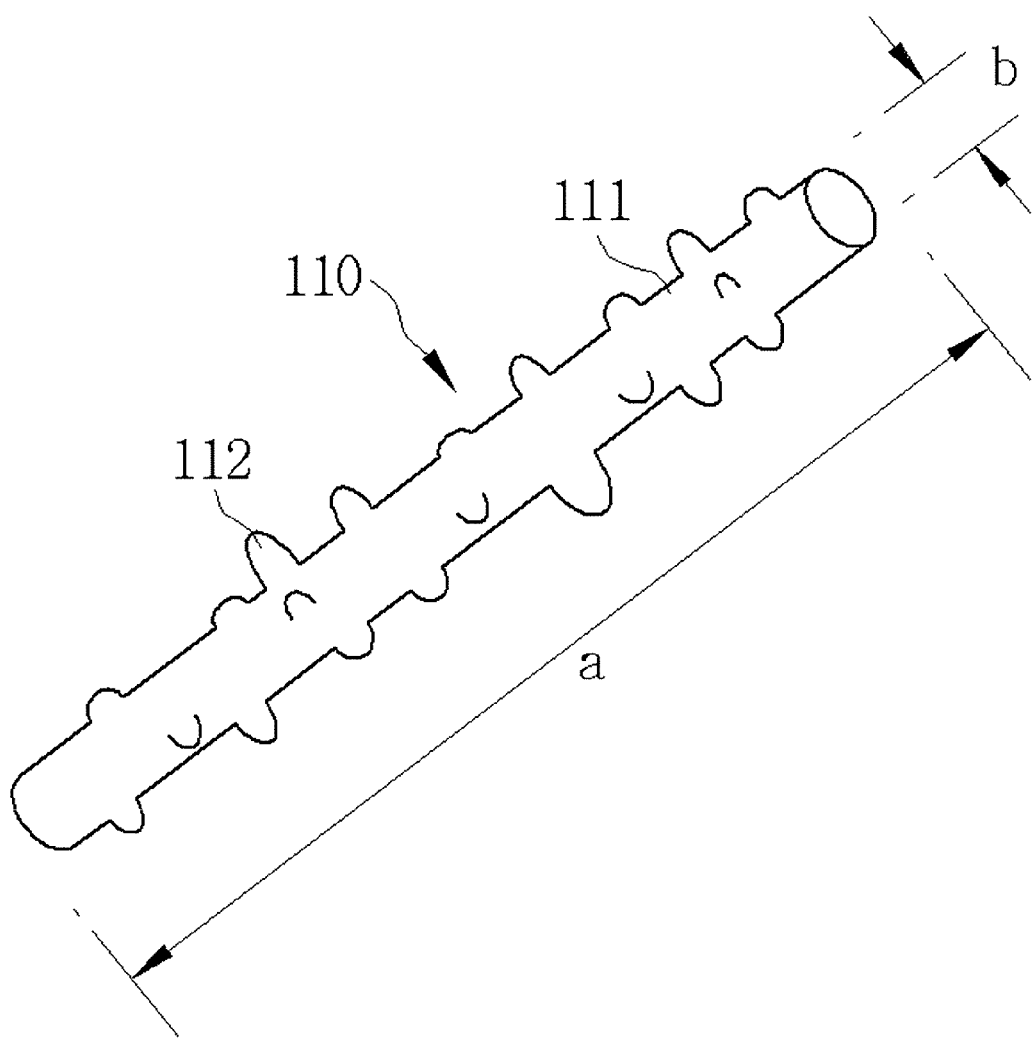
FIG. 9 is a perspective diagram for explaining the configuration of the whisker-shaped ceramic particles having projections formed thereon in the organic-inorganic composite according to a first modified embodiment of the present invention.
Figure 10:
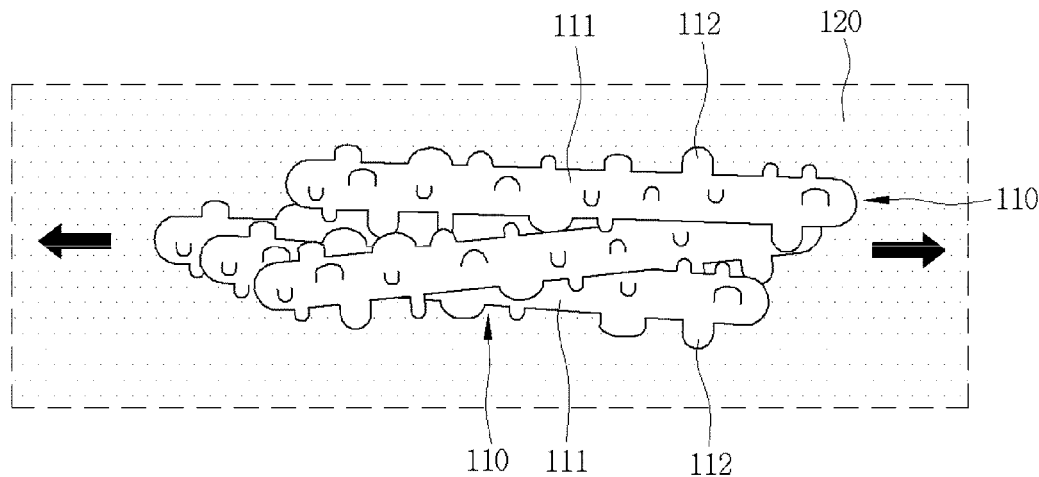
FIG. 10 is a partial cross-sectional diagram for explaining the function of the projections formed on the whisker-shaped ceramic particles in the organic-inorganic composite according to a first modified embodiment of the present invention.

FIG. 9 is a perspective diagram for explaining the configuration of the whisker-shaped ceramic particles having projections formed thereon in the organic-inorganic composite according to a first modified embodiment of the present invention, and FIG. 10 is a partial cross-sectional diagram for explaining the function of the projections formed on the whisker-shaped ceramic particles in the organic-inorganic composite according to a first modified embodiment of the present invention.

As illustrated in the drawings, the organic-inorganic composite according to the first modified embodiment of the present invention is characterized in that the ceramic particles (110) are composed of whisker-shaped ceramic particles having a ratio of length (a) to breadth (b) of 5:2 or more. In a case in which the ceramic particles (110) are composed of the whisker-shaped ceramic particles, there may be some differences in the detailed properties and detailed usage exerted by the morphological difference as compared to the plate-shaped ceramic particles (110) described above but the functions of the projections (112) and the action and effect expected therefrom may not differ.

In other words, the area of the ceramic particles (110) combined with the resin (120) can be maximized by a great number of the fine projections (112) even in a case in which the organic-inorganic composite is equipped with the whisker-shaped ceramic particles (110) having the projections (112) formed on the surface thereof, and thus the coupling force between the ceramic particles (110) and the resin (120) is significantly increased. In addition, the shear resistance at the interface between the ceramic particles (110) and the resin (120) is increased by the anchoring action of the projections (112) formed to project out from the surface (111) of the ceramic particles (110), and thus a high shear resistance is exhibited with respect to the external force acting in the transverse direction, especially the tensile force acting in the transverse direction and it is also possible to suppress various types of damages including brittle fracture. In addition, the anchoring action is exhibited as the projections (112) formed to project out from the surface (111) of the ceramic particles (110) come in partial contact with one another (to extend over) as illustrated in FIG. 10 and thus the shear resistance is increased so that the projections (112) do not slip from one another in the transverse direction. This makes it possible to exhibit a high shear resistance with respect to the external force acting in the transverse direction, especially the tensile force acting in the transverse direction indicated by the arrow and also to suppress various types of damages including brittle fracture.

Figure 11:
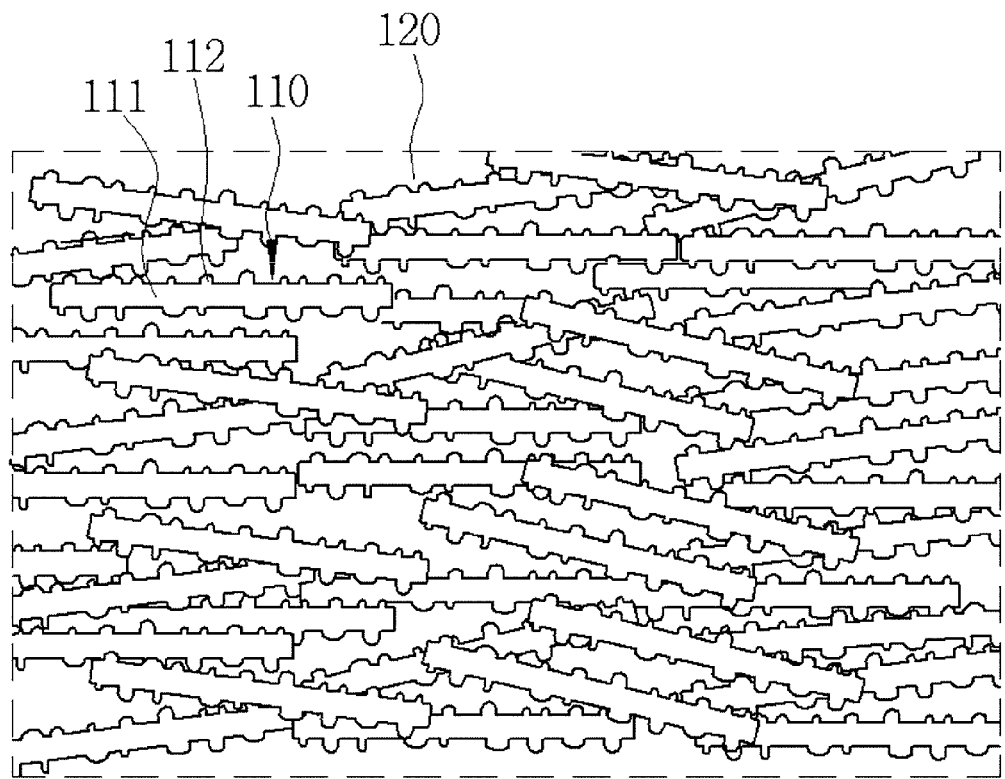
FIGS. 11 to 13 are a series of cross-sectional diagrams illustrating the states of the organic-inorganic composites according to a first modified embodiment of the present invention to which the whisker-shaped ceramic particles are added at different contents.
Figure 12:
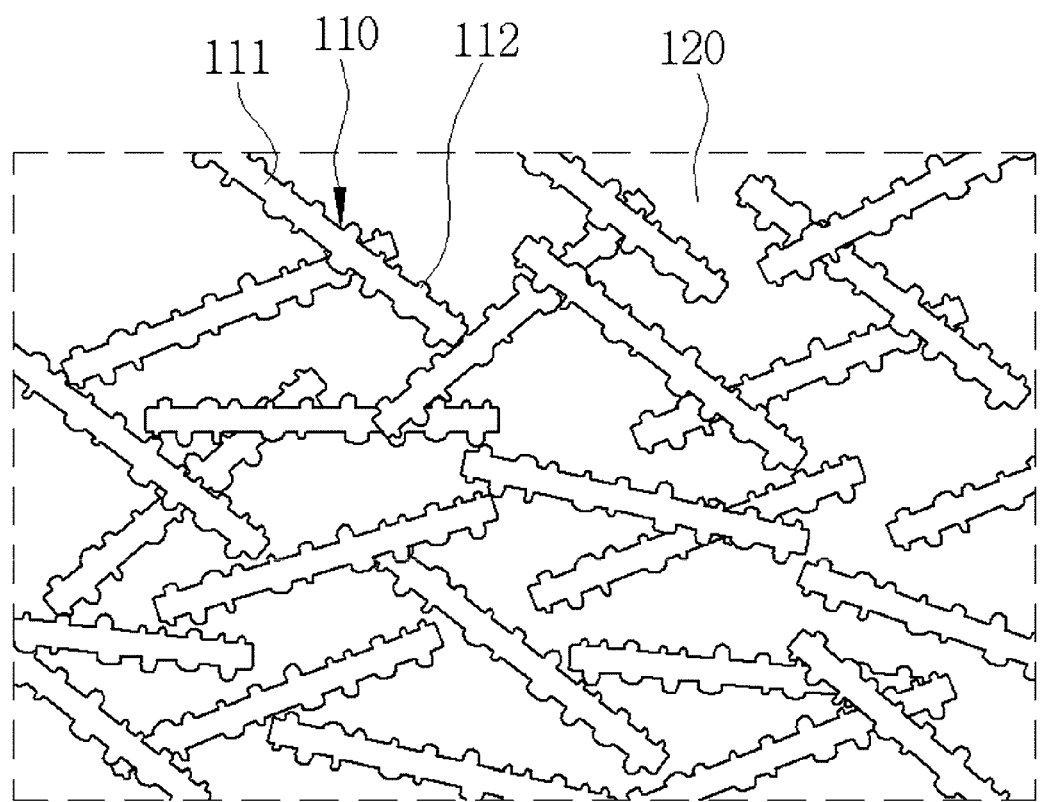
Figure 13:
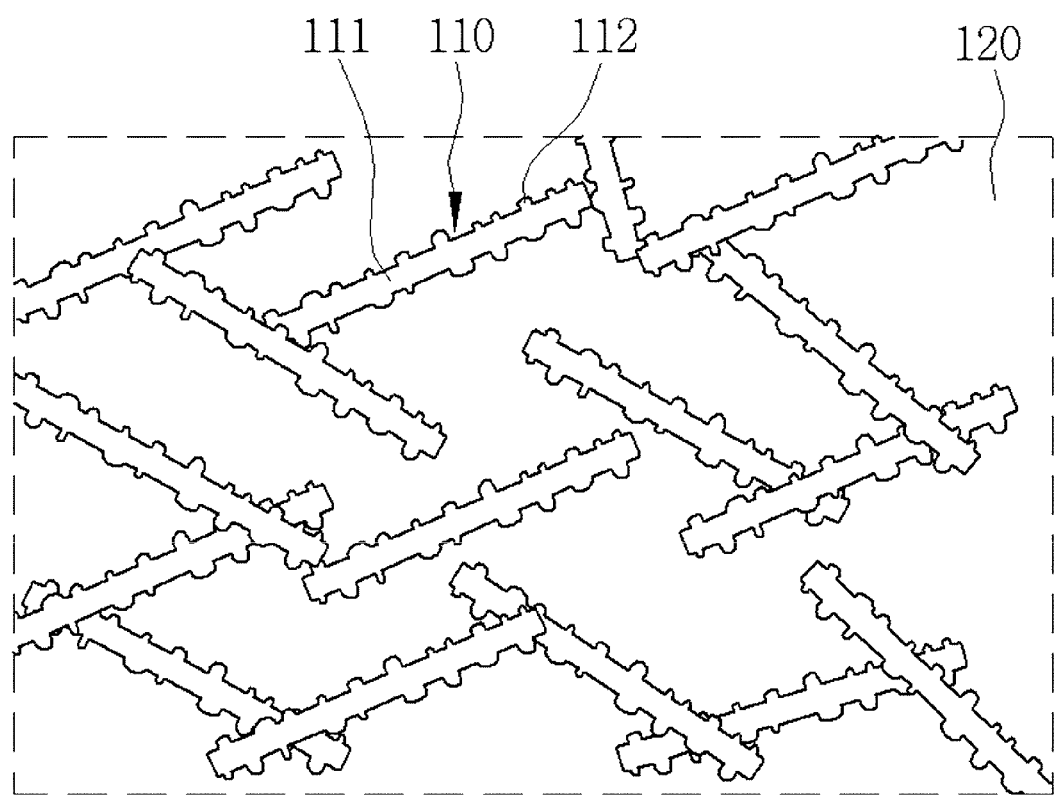

FIGS. 11 to 13 are a series of cross-sectional diagrams illustrating the states of the organic-inorganic composites according to embodiments of the present invention to which the whisker-shaped ceramic particles are added at different contents.

As illustrated in the drawings, it is also possible to configure the organic-inorganic composite according to the first modified embodiment of the present invention such that the anchoring effect can be maximized while the projections (112) come in partial contact with one another through a configuration in which the orientation angle of the ceramic particles (110) is controlled for each content in a case in which the content of the ceramic particles (110) varies in the same manner as in the embodiment before being modified. In other words, in a case in which the content of the whisker-shaped ceramic particles (110) is gradually decreased as illustrated in FIGS. 11 to 13, it is possible to have a configuration to maximize the partial contact between the projections (112) and the anchoring effect through a configuration to increase the orientation angle of the whisker-shaped ceramic particles (110) with respect to the horizontal plane on contrary.

Meanwhile, other configurations of the organic-inorganic composite according to the first modified embodiment of the present invention, which are not described here are substantially the same as the embodiment before being modified and thus the detailed description thereon will be omitted.

Figure 14:
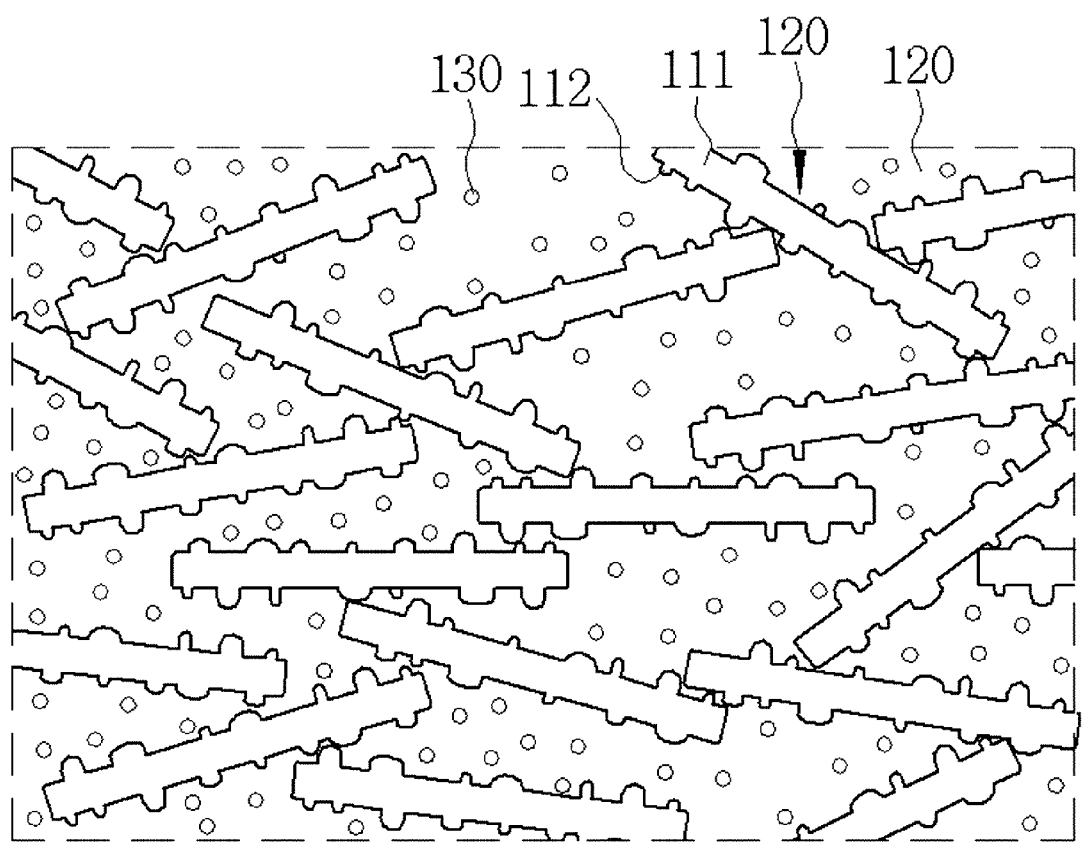
FIG. 14 is a partial cross-sectional diagram for explaining the configuration of the organic-inorganic composite according to a second modified embodiment of the present invention.

FIG. 14 is a partial cross-sectional diagram for explaining the configuration of the organic-inorganic composite according to a second modified embodiment of the present invention.

As illustrated in the drawing, the organic-inorganic composite according to the second modified embodiment of the present invention is characterized in that spherical ceramic balls (130) are added as an additive for increasing the frictional force in addition to the plate-shaped or whisker-shaped ceramic particles (110). The additive is in a state to be naturally disposed in the gap that is not occupied by the ceramic particles (110) and plays a role to increase the frictional force between the ceramic particles (110) and between the ceramic particles (110) and the resin (120).

Here, it is advantageous that the ceramic balls (130) are formed in a medium size to be smaller than the ceramic particles (110) and to be larger than the projections (112) when disposing the ceramic balls (130) between the ceramic particles (110).

Meanwhile, other configurations of the organic-inorganic composite according to the second modified embodiment of the present invention, which are not described here are substantially the same as the embodiment before being modified and thus the detailed description thereon will be omitted.

In addition, although it is not illustrated in the drawing, it is also possible to implement a third modified embodiment to configure an organic-inorganic composite by plate-shaped and whisker-shaped ceramic particles (110) having projections formed on the surface thereof together with the resin (120) on the basis of the facts described so far. In this case, the whisker-shaped ceramic particles (110) can be positioned between the plate-shaped ceramic particles (110) and thus it is possible to increase the content of the ceramic particles (110) and to more densely dispose the ceramic particles (110).

Meanwhile, other configurations of the organic-inorganic composite according to the first modified embodiment of the present invention, which are not described here are substantially the same as the embodiment before being modified and thus the detailed description thereon will be omitted.

The invention has been described in detail with reference to preferred embodiments thereof, but the invention can use various changes, modifications, and equivalents. It is clear that the invention can appropriately modify the above embodiments and apply the modified embodiments in the same manner. Hence, the disclosure is not intended to limit the scope of the invention as defined by the appended claims.

INDUSTRIAL APPLICABILITY

The organic-inorganic composite equipped with ceramic particles having fine projections formed on the surface thereof according to an embodiment of the present invention can be widely utilized in various structures in machinery, construction, and civil engineering fields, parts for electronic apparatuses, functional films, and the like, as well as transporters such as an aircraft, a motor vehicle, and a train which are often exposed to extreme environments such as changes in temperature and scratches as well as various types of loads and impacts involving changes in pressure as they are.

The invention claimed is:

1. An organic-inorganic composite comprising:
a plurality of anisotropic ceramic particles having different aspect ratios; and
a resin combined with the ceramic particles,
wherein shear resistance at an interface between the ceramic particles and the resin is increased as the organic-inorganic composite further comprises a plurality of projections projecting out from a surface of the ceramic particles and
shear resistance between the ceramic particles is increased by the projections as at least some of the ceramic particles neighboring one another are closely disposed so as to bring the projections into partial contact with one another.

2. The organic-inorganic composite of claim 1, wherein the ceramic particles are plate-shaped particles having an aspect ratio of 2:5 or less or whisker-shaped particles having an aspect ratio of 5:2 or more.

3. The organic-inorganic composite of claim 2, wherein spherical ceramic balls having a smaller size are further disposed between the anisotropic ceramic particles as an additive for friction enhancement.

4. The organic-inorganic composite of claim 2, wherein the projections are composed of two or more kinds of projections having different sizes and/or shapes.

5. The organic-inorganic composite of claim 4, wherein the projection is formed in an area of from 10 to 95% of a total area of a surface of the ceramic particles.

6. The organic-inorganic composite of claim 4, wherein the projection projecting out from a surface of the ceramic particles has a height of from 10 to 700 nm.

7. The organic-inorganic composite of claim 4, wherein the projection is the same kind of substance as the ceramic particles.

8. The organic-inorganic composite of claim 4, wherein the projection is a different kind of substance from the ceramic particles.

9. The organic-inorganic composite of claim 2, wherein a content of the ceramic particles in the organic-inorganic composite is from 30 to 95% by weight.

10. The organic-inorganic composite of claim 9, wherein an average orientation angle of the ceramic particles with respect to a parallel plane decreases as the content of the ceramic particles in the organic-inorganic composite increases.

11. The organic-inorganic composite of claim 10, wherein a density of the ceramic particles is increased by setting the average orientation angle of the ceramic particles with respect to a parallel plane to 30□ or less in a case in which the content of the ceramic particles in the organic-inorganic composite is 50% by weight or more.

12. The organic-inorganic composite of claim 9, wherein a material of the ceramic particles is a substance of a metal oxide or a metal nitride.

13. The organic-inorganic composite of claim 9, wherein a material of the ceramic particles is any one selected from the group consisting of calcium carbonate, zinc oxide, alumina, silica, titania, carbon, silicon carbide, aluminum nitride, and boron nitride.

14. The organic-inorganic composite of claim 2, wherein the resin is any one selected from the group consisting of a polyamide-based resin, a polyimide-based resin, a polyacetal-based resin, a polyester-based resin, a polysulfone-based resin, a polyphenylene sulfide-based resin, a polyethylene-based resin, and polypropylene.

15. An organic-inorganic composite comprising:
a plurality of ceramic particles; and
a resin combined with the ceramic particles,
wherein shear resistance at an interface between the ceramic particles and the resin is increased as the organic-inorganic composite further comprises a plurality of projections projecting out from a surface of the ceramic particles and
shear resistance between the ceramic particles is increased by the projections as at least some of the ceramic particles neighboring one another are closely disposed so as to bring the projections into partial contact with one another.

16. The organic-inorganic composite of claim 15, wherein the projections are composed of two or more kinds of projections having different sizes and/or shapes and formed in an area of from 10 to 95% of a total area of a surface of the ceramic particles, and a content of the ceramic particles in the organic-inorganic composite is from 30 to 95% by weight.

17. A transporter selected from the group consisting of an aircraft, a motor vehicle, and a train, wherein the organic-inorganic composite of claim 1 is used as a material for a part thereof.

18. A functional film comprising the organic-inorganic composite of claim 1.

19. An architectural composite comprising the organic-inorganic composite of claim 1.

20. An electronic apparatus, wherein the organic-inorganic composite of claim 1 is used as a material for a part thereof.

* * * * *